April 20, 1954    C. HEMM ET AL    2,675,733
TRAVELING BRAIDING MACHINE
Filed March 23, 1953    4 Sheets-Sheet 3

INVENTORS
CHARLES HEMM
BY TOM GARSTANG
Benj. T. Rauber
ATTORNEY

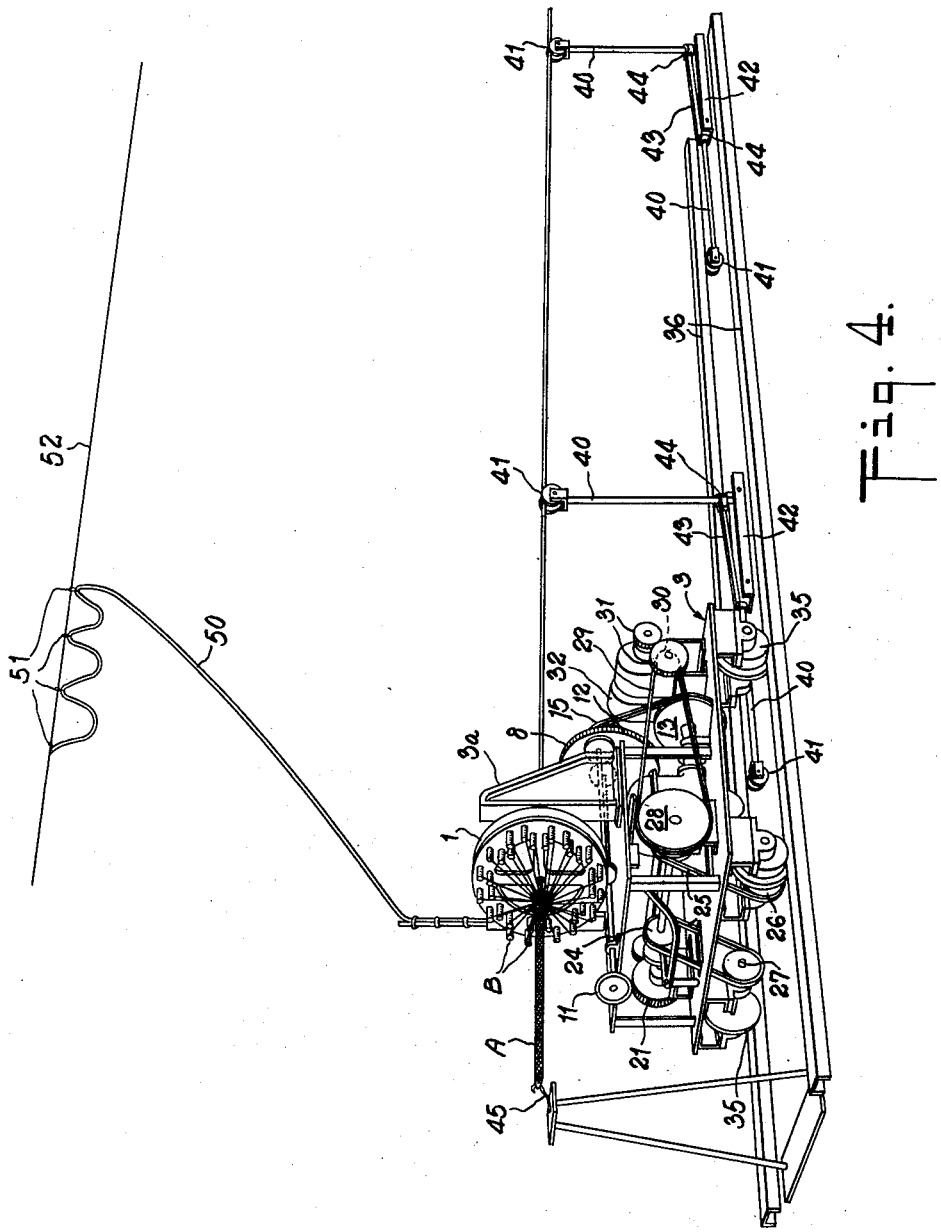

Patented Apr. 20, 1954

2,675,733

UNITED STATES PATENT OFFICE 2,675,733

TRAVELING BRAIDING MACHINE

Charles Hemm, Adlington, near Macclesfield, and Tom Garstang, Stockport, England, assignors to Dunlop Tire and Rubber Corporation, Buffalo, N. Y., a corporation of New York Application March 23, 1953, Serial No. 344,140

7 Claims. (Cl. 87—34)

1

This invention relates to apparatus for the formation of tubular braiding on rubber hose or like tubular goods.

It is known to form braiding on hose by mounting the hose on a mandrel and then passing the hose and mandrel through a braiding machine. This arrangement requires a considerable amount of floor space, i. e. a length substantially double that of the mandrel used and is particularly uneconomical when the length of hose to be braided is fairly substantial.

Our invention provides braiding apparatus which enables a substantial economy in floor space to be attained.

According to our invention apparatus for the formation of braid on rubber hose or like articles comprises a fixed mandrel for supporting the hose to be braided, a braiding machine movable along the mandrel, means for moving the machine at a speed correlated with the rate of the braiding operation and movable spaced supports for the mandrel adapted for temporary withdrawal from and insertion into the path of travel of the braiding machine so as to permit passage thereof while providing adequate support for the mandrel.

Preferably the braiding machine is mounted on a wheeled trolley which runs on a pair of rails. A motor for driving the trolley and for operating the braiding machine is mounted on the trolley itself and a system of gears is also mounted on the trolley for relating the rate of linear movement of the trolley with the rate of operation of the braiding machine.

Conveniently the supports for the mandrel consist of a series of pillars pivotally mounted at their bases in pairs, each pair of adjacent pillars being between the trolley rails at spaced intervals. The pillars of each pair are so linked together that when one of the pillars of a pair is vertical the other pillar of said pair lies flat between the rails. Thus as one pillar of a linked pair is pushed over by the braiding machine in its travel the other pillar is pulled into supporting position in the rear of the travelling braiding machine.

A preferred embodiment of the invention will now be more particularly described, by way of example, in the accompanying drawings in which—

2

Fig. 4 shows a perspective view of the apparatus.

Figure 2:
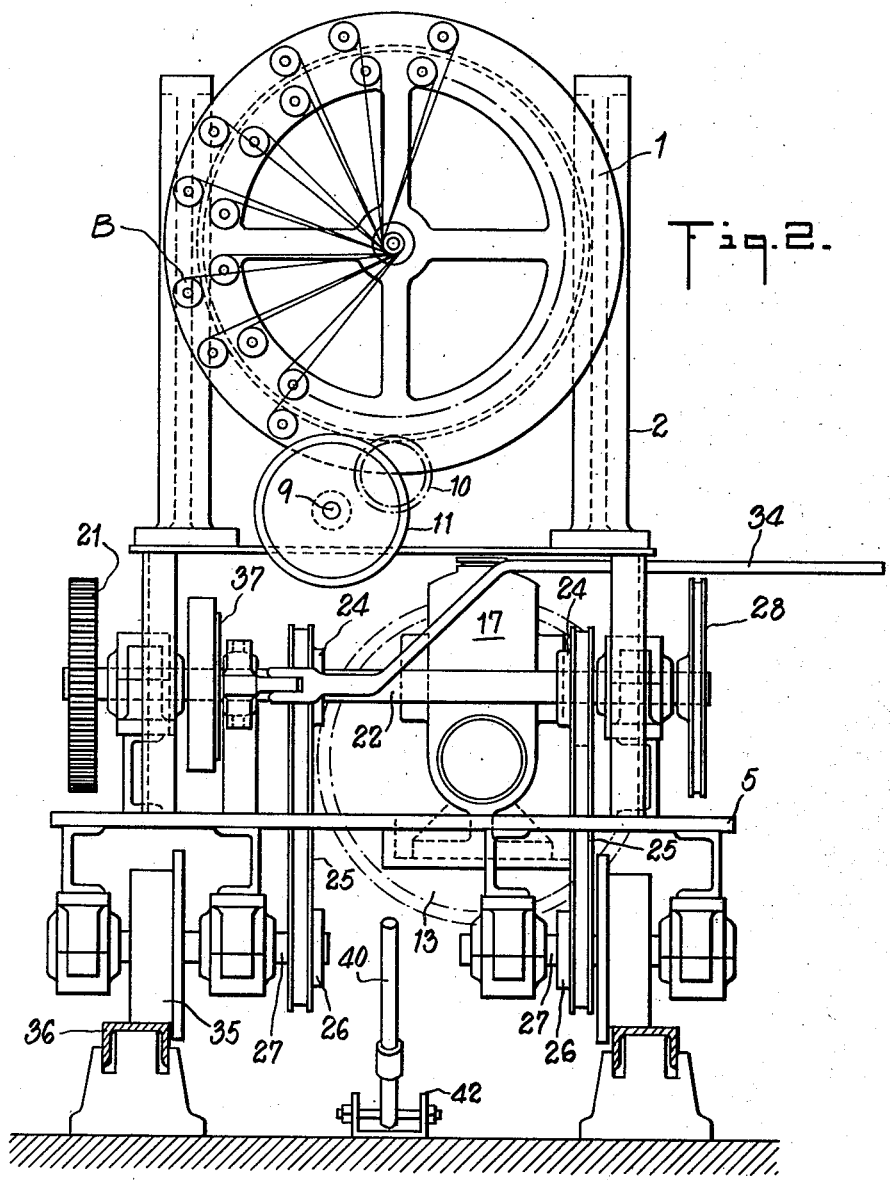
Fig. 2 shows an end elevational view of the apparatus, certain parts being omitted for the sake of clarity.
Figure 3:
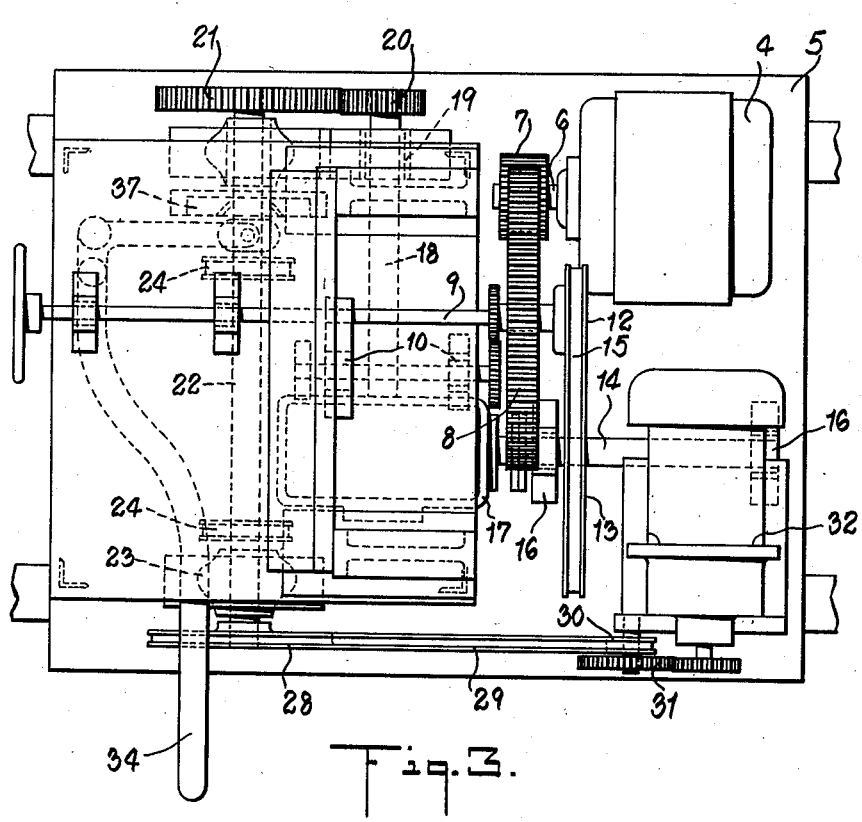
Fig. 3 shows a plan view of the apparatus as shown in Fig. 2.

A braiding mechanism (Figs. 1, 2 and 3), acting on the maypole principle and secured to the superstructure 3a of a trolley 3, consists of a circular base unit 1 held vertically and carrying a number of bobbin supports (not shown) arranged with their longitudinal axes horizontally around a central aperture in the base unit through which is passed a mandrel 2 on which is fitted temporarily a length A of rubber hose to be braided. The mandrel consists of a length of rod or tube of steel or other suitable material, rods being used for smaller diameters of hose. An electric motor 4, Fig. 3, is fitted to the platform 5 of the trolley together with the necessary driving means for the trolley and braiding machine and a gearing system for relating the speed of the trolley to the speed of operation of the braiding machine.

The motor shaft 6 carries a pinion 7 meshing with a gear wheel 8 on a shaft 9 which is entrained with the braiding mechanism through a train of gears 10. One end of the shaft 9 carries a hand wheel 11 and the other end of the shaft carries a sprocket 12 which is connected to a further sprocket 13 on a shaft 14 by an endless driving chain 15. The shaft 14 is carried by journal bearings 16—16 and is connected to a reduction gear box 17. The gear box 17 has an output shaft 18 supported by a journal bearing 19. A pinion 20 on the output shaft 18 meshes with a gear wheel 21 which is drivably connected to a cross-shaft 22 supported by journal bearings 23—23 through a clutch 37. The cross-shaft 22 carries sprockets 24—24 which are connected by endless driving chains 25—25 to further sprockets 26—26 on driving axles 27 of the trolley 3.

The end of the cross-shaft 22 remote from the clutch 37 carries a further sprocket 28 connected by a driving chain 29 to a sprocket 30 connected by a gear train 31 to the shaft of a second electric motor 32. A switch 33, Fig. 1, for the motor 32 is secured to the superstructure 3a of the trolley and is operated by a clutch operating lever 34 in a manner which will be later described.

The trolley is provided with flanged wheels 35 running on rails 36. Electric power for the motors 4 and 32 is carried by a cable 50 (Fig. 4) carried by sliding rings 51 on an overhead supporting wire parallel with the track.

Figure 1:
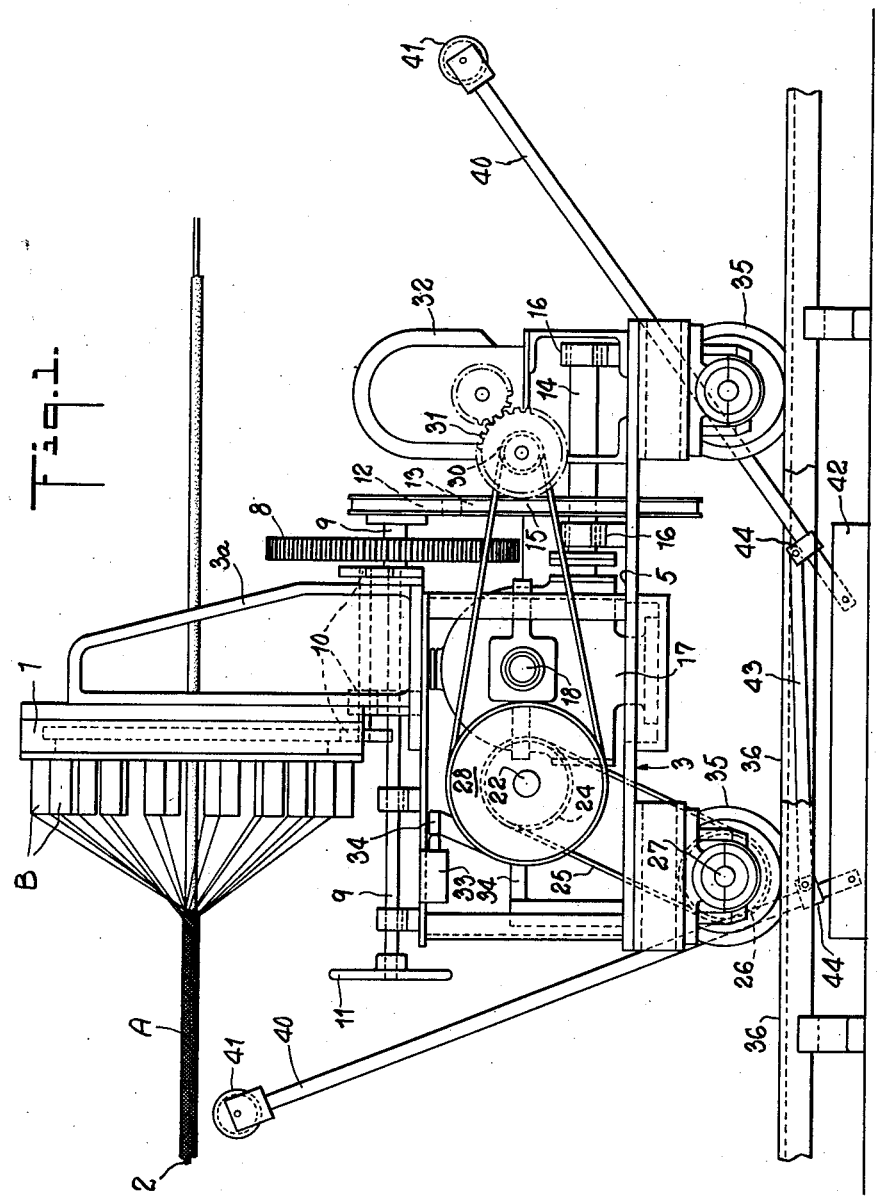
Fig. 1 shows a side elevational view of the apparatus.

As shown in Figs. 1 and 4, a series of pairs of pillars 49 (only one pair of which is shown in Fig. 1) are disposed at intervals between the rails 36 on which the trolley 3 runs. These pillars carry at their upper ends freely rotatable reels 41 for supporting the mandrel and are pivotally mounted at their bases to brackets 42. The pillars 40 in each pair are linked together by means of a rod 43 pivotally connected to the respective pillars 40, by a crank 44 projecting from the base of each pillar 40. This connecting rod 43 is so arranged that when one pillar 40 stands vertically upright the other pillar 40 lies flat between the rails. An anchor 45 at one end of the rails and at suitable height is provided for holding securely one end of the mandrel.

In operation the forward pillars 40 of each pair are set in the upright position and the mandrel 2 carrying the rubber hose A is anchored at the beginning of the track and is supported by the series of upright pillars 40, the mandrel 2 passing through the aperture in the circular base unit 1. Bobbins B are fitted to the supports on the base unit which supports project towards the rear of the machine. The motor 4 is switched on with the clutch in engagement and drives the braiding mechanism through the gears 8 and 10 and the shaft 9. Drive is also transmitted to the trolley driving axle 27 from the shaft 9 through the chain and sprockets 15, 12, 13 and the gear box 17 and gears 20, 21 to the shaft 22 and thence through the chain and sprocket drives 24, 25, 26. The trolley 3 thus progresses along the rails 36 while the braid is laid on the hose A, the velocity of the trolley relative to the rate of braiding being determined by ratio between the overall gearing of each drive. This ratio can be altered easily by altering the relative sizes of the pinion 20 and gear wheel 21. As the trolley moves forward braid is formed on the hose rearwards of the machine, the forward movement of the trolley pushing over an upright pillar 40 when one is reached causing the horizontal pillar 40 linked to said upright pillar to rise until eventually it becomes vertical and the first mentioned pillar lies flat. Continued support for the mandrel in the rear of the travelling braiding machine is thus provided.

When the braiding reaches the end of the tube the motor 4 is switched off and the threads from the bobbins B cut. The lever 34 is operated to disengage the clutch 37 thus freeing the shaft 22 from the drive from the motor 4. The movement of the lever 34 operates the contacts in the switch 33 to excite the motor 32. The motor then drives the shaft 22 and consequently the axle 27 in the reverse direction through the gear train 31 and the chain and sprocket drive 30, 29, 28, and the trolley 3 is propelled back to its starting point. As the trolley moves back it contacts the pillars 40 which have been brought upright during braiding and pushes them over thus raising the first pillar of each pair in readiness for the next length of braiding.

It will be appreciated that with this arrangement of fixed mandrel and travelling braiding machine it is now possible to form the braid on a length of hose using only a floor space which in length is substantially equal to the length of the hose. This is in contrast with the requirement of a floor space of substantially double the length of the hose to be braided hitherto required.

Having described our invention, what we claim is:

1. Apparatus for the formation of braid on rubber hose or like articles comprising a fixed mandrel for supporting the hose to be braided, a braiding machine movable along the mandrel, a common driving motor for the braiding machine and for moving the machine at a speed correlated with the rate of the braiding operation, and movable spaced supports for the mandrel for temporary withdrawal from and insertion into the path of travel of the braiding machine to permit passage thereof while providing adequate support for the mandrel.

2. Apparatus according to claim 1 wherein the braiding machine is mounted on a wheeled trolley mounted on rails.

3. Apparatus according to claim 2 wherein the trolley carries said common motor for driving the trolley and operating the braiding machine and gears mounted on the trolley to relate the rate of linear movement of the trolley with the rate of operation of the braiding machine.

4. Apparatus according to claim 2 wherein the trolley carries a second motor for driving the trolley in the reverse direction through a system of gears, and means for disconnecting the drive from the first motor to the trolley when the second motor is in operation.

5. Apparatus according to claim 2 wherein the supports for the mandrel consist of a series of pillars pivotally mounted at their bases and spaced apart in the path of travel of the braiding machine, and linkages connected between pairs of adjacent pillars to tilt one pillar to vertical position when the other is flat.

6. Apparatus according to claim 5 wherein each pillar is provided with a rotatably mounted reel for supporting the mandrel.

7. The apparatus of claim 5 in which said linkages each comprises a link secured to each of a pair of pillars and of a length greater than the distance between the pivotal mountings of the pillars of said pair.

References Cited in the file of this patent

UNITED STATES PATENTS

| Number | Name | Date |
| --- | --- | --- |
| 614,701 | Cundiff | Nov. 22, 1898 |
| 861,703 | Blakesley | July 30, 1907 |
| 1,383,522 | Brown | July 5, 1921 |
| 1,779,775 | Krisiep | Oct. 28, 1930 |
| 1,997,211 | Ford et al. | Apr. 9, 1935 |